US010599942B2

(12) United States Patent
Kuo et al.

(10) Patent No.: US 10,599,942 B2
(45) Date of Patent: Mar. 24, 2020

(54) TARGET TRACKING METHOD AND SYSTEM ADAPTABLE TO MULTI-TARGET TRACKING

(71) Applicant: Wistron Corporation, New Taipei (TW)

(72) Inventors: Shih-Hao Kuo, New Taipei (TW); Ming-Che Ho, New Taipei (TW)

(73) Assignee: Wistron Corporation, New Taipei (TW)

( * ) Notice: Subject to any disclaimer, the term of this patent is extended or adjusted under 35 U.S.C. 154(b) by 91 days.

(21) Appl. No.: 15/824,884

(22) Filed: Nov. 28, 2017

(65) Prior Publication Data

US 2019/0114501 A1    Apr. 18, 2019

(30) Foreign Application Priority Data

Oct. 16, 2017   (TW) .............................. 106135289 A

(51) Int. Cl.
| | |
|---|---|
| *G06K 9/00* | (2006.01) |
| *G06K 9/32* | (2006.01) |
| *G06T 7/20* | (2017.01) |
| *G06K 9/62* | (2006.01) |

(Continued)

(52) U.S. Cl.
CPC ......... *G06K 9/3241* (2013.01); *G06K 9/6201* (2013.01); *G06K 9/6267* (2013.01); *G06T 7/20* (2013.01); *G06T 7/248* (2017.01); *G06T 7/44* (2017.01); *G06K 2009/3291* (2013.01); *G06T 2207/10016* (2013.01); *G06T 2207/30196* (2013.01); *G06T 2207/30232* (2013.01)

(58) Field of Classification Search
CPC .................................................. G06K 9/3241
See application file for complete search history.

(56) References Cited

U.S. PATENT DOCUMENTS

| | | | |
|---|---|---|---|
| 2012/0177121 A1* | 7/2012 | Tripathi .................... | G06T 7/20 375/240.16 |
| 2016/0267325 A1* | 9/2016 | Sundaresan ........ | G06K 9/00624 |
| 2017/0256065 A1* | 9/2017 | Wu ......................... | G06T 7/215 |

(Continued)

FOREIGN PATENT DOCUMENTS

TW    201530496 A    8/2015

OTHER PUBLICATIONS

Office Action Dated Feb. 26, 2018 in corresponding Taiwan Patent Application No. 106135289.

*Primary Examiner* — Oneal R Mistry
(74) *Attorney, Agent, or Firm* — Donald E. Stout; Stout, Uxa & Buyan, LLP

(57) ABSTRACT

A target tracking method and system adaptable to multi-target tracking include performing global-search detection on a current image to obtain candidates of the current image. Association between the candidates and a tracked target is performed to determine similarity between the candidates and the tracked target and to give corresponding similarity values to the candidates. The candidate with a maximum similarity value is defined as an associated candidate of the tracked target. Candidates with non-zero similarity values and primary-object classification other than the associated candidate are filtered out and defined as filtered candidates. New tracked targets are generated according to the associated candidate and the filtered candidates.

18 Claims, 7 Drawing Sheets

(51) Int. Cl.
*G06T 7/44* (2017.01)
*G06T 7/246* (2017.01)

(56) References Cited

U.S. PATENT DOCUMENTS

2018/0012078 A1* 1/2018 Pournaghi .......... G06K 9/00718
2018/0374233 A1* 12/2018 Zhou ........................ G06T 7/70
2019/0258870 A1* 8/2019 Kundu ............... G06K 9/00718

* cited by examiner

TARGET TRACKING METHOD AND SYSTEM ADAPTABLE TO MULTI-TARGET TRACKING

CROSS-REFERENCE TO RELATED APPLICATIONS

This application claims priority of Taiwan Patent Application No. 106135289, filed on Oct. 16, 2017, the entire contents of which are herein expressly incorporated by reference.

BACKGROUND OF THE INVENTION

1. Field of the Invention

The present invention generally relates to video tracking, and more particularly to target tracking method and system adaptable to multi-target tracking.

2. Description of Related Art

Video tracking is a technique of locating a moving object using a camera, and may be adapted to a variety of applications such as human-computer interaction, security and surveillance, traffic control, and augmented reality (AR).

In conventional video tracking, global-search detection is performed on the first image to find out a tracked target, for example, a specific object such as a person or a car. From the second image onwards, local-search detection is performed on a current image in the vicinity of the tracked target of a previous image, thereby finding out a similar object defined as a tracked target of the current image. The local-search detection is repeatedly performed on all the succeeding images to determine respective tracked target.

Regarding the conventional video tracking, if one target tracking is performed in error, all succeeding images will suffer the error without a chance of recovery. Moreover, as only the first image is subjected to global-search detection, a person newly presented after the second image cannot be defined as a tracked target. Accordingly, all objects to be tracked should be presented in the first image in order to carry out multi-target tracking, making the application inconvenient.

A need has thus arisen to propose a novel target tracking method adaptable to multi-target tracking in order to overcome disadvantages of the conventional video tracking and enhance accuracy and convenience of video tracking.

SUMMARY OF THE INVENTION

In view of the foregoing, it is an object of the embodiment of the present invention to provide target tracking method and system adaptable to multi-target tracking, which is capable of adding or removing tracked targets in progress, and recovering from erroneous tracking in a preceding image.

According to one embodiment, global-search detection is performed on a current image to obtain candidates of the current image. Association between the candidates and a tracked target is performed to determine similarity between the candidates and the tracked target and to give corresponding similarity values to the candidates. A candidate with a maximum similarity value is selected and defined as an associated candidate of the tracked target. Candidates with non-zero similarity values and primary-object classification other than the associated candidate are filtered out to result in filtered candidates. New tracked targets are generated according to the associated candidate and the filtered candidates.

DETAILED DESCRIPTION OF THE INVENTION

Figure 1A:
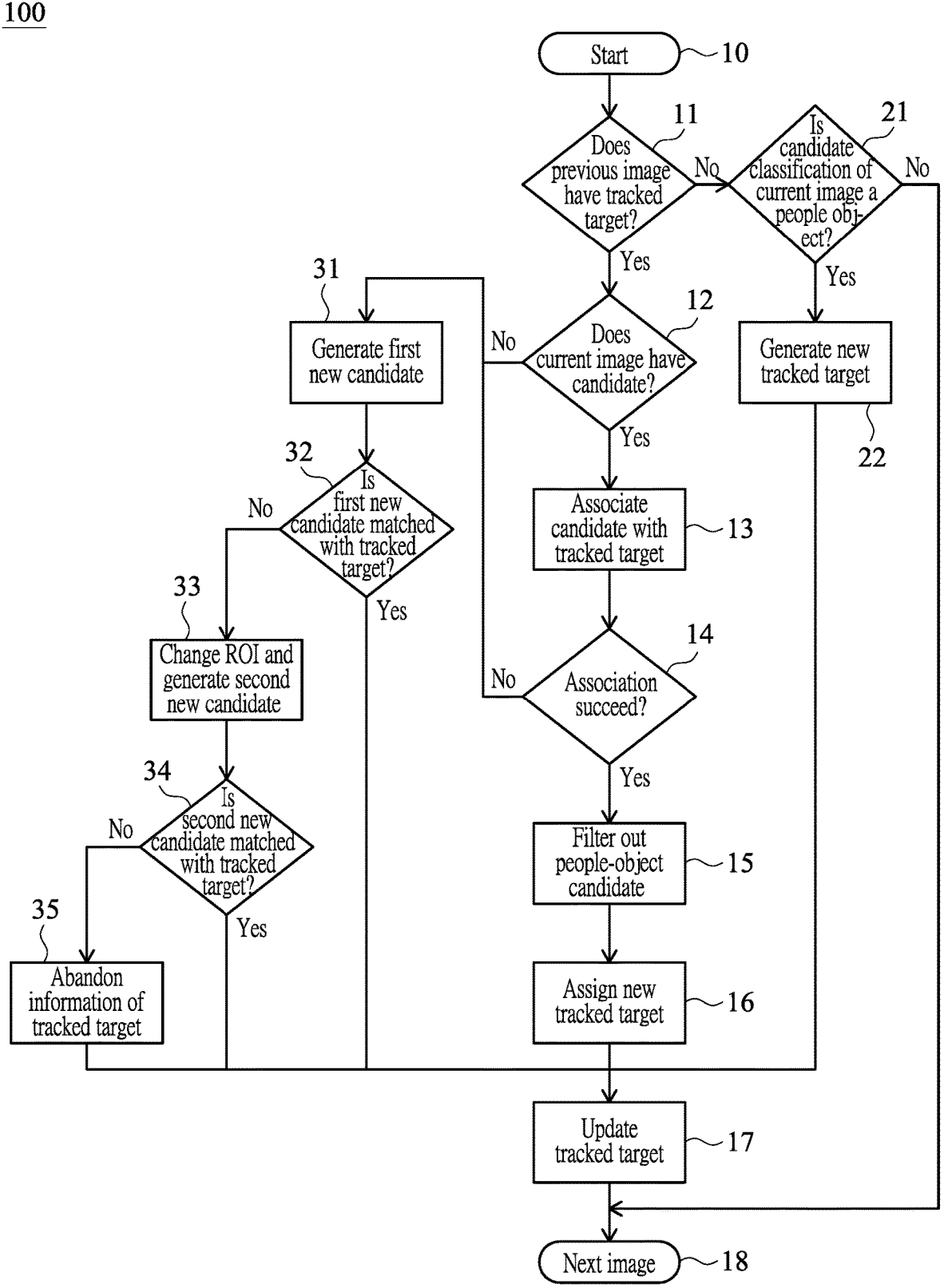
FIG. 1A shows a flow diagram illustrating a target tracking method adaptable to multi-target tracking according to one embodiment of the present invention.
Figure 1B:
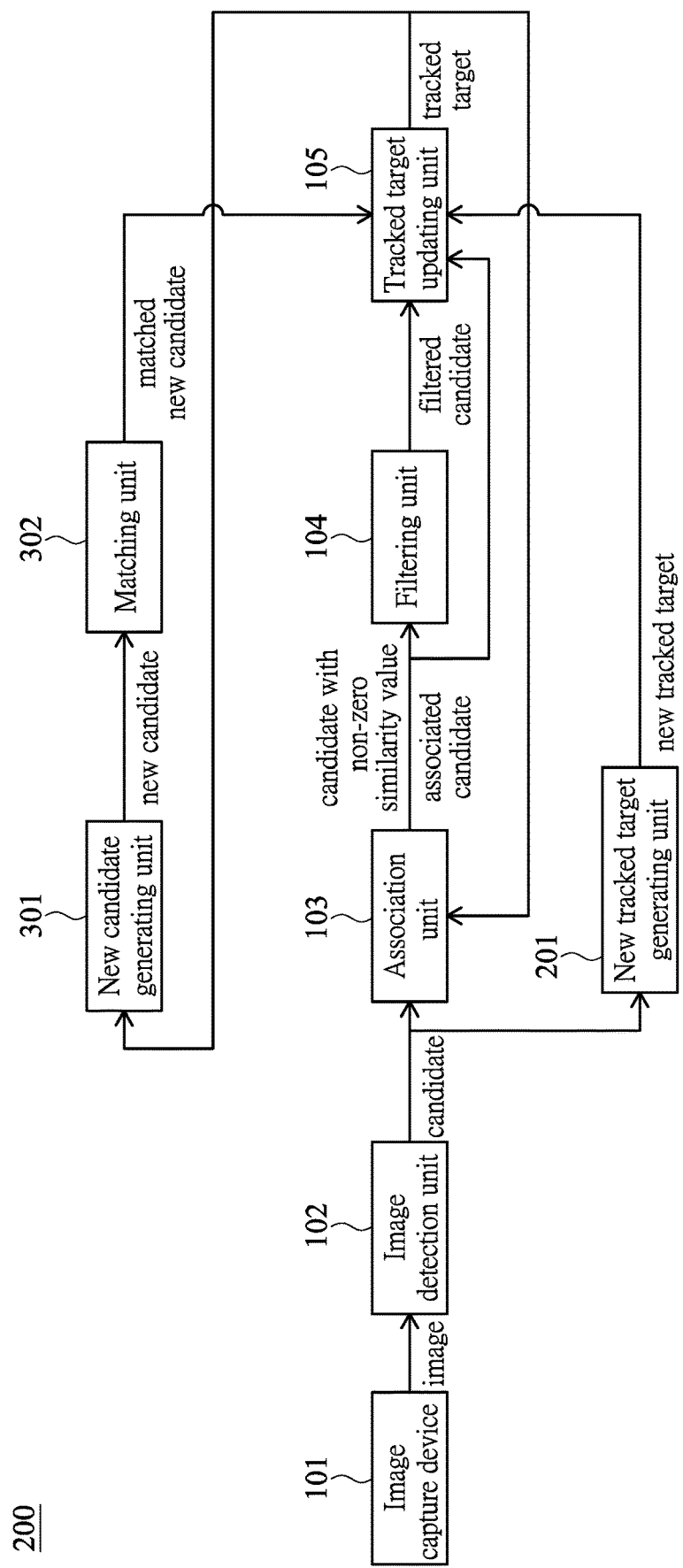
FIG. 1B shows a block diagram illustrating a target tracking system adaptable to multi-target tracking according to the embodiment of the present invention.

FIG. 1A shows a flow diagram illustrating a target tracking method 100 adaptable to multi-target tracking according to one embodiment of the present invention, and FIG. 1B shows a block diagram illustrating a target tracking system 200 adaptable to multi-target tracking according to the embodiment of the present invention, which is capable of tracking a single target or multiple targets. The steps of FIG. 1A and the blocks of FIG. 1B may be implemented by hardware, software or their combinations. For example, the embodiment may be performed by executing computer instructions in a processor such as a digital image processor. The target tracking of the present invention will be described in companion with FIG. 1A and FIG. 1B.

In the embodiment, an image capture device 101 of the target tracking system 200 may be a two-dimensional (2D) image capture device such as a 2D camera, or a three-dimensional (3D) image capture device such as a 3D camera. An image captured by the image capture device 101 may be fed to an image detection unit 102, which performs detection on the image to obtain foreground objects defined as candidates. The image detection can be performed by conventional techniques, details of which are omitted for brevity.

According to one aspect of the embodiment, the image detection unit 102 may perform global-search detection on each image captured by the image capture device 101. For the 2D image capture device, a background subtraction technique may be adopted to obtain candidates; and for the 3D image capture device, depth information may be used to obtain candidates. In the embodiment, candidate information may include a classification, coordinates, a region of interest (ROI) and an image descriptor. In another embodiment, candidate information may include more or fewer entries.

In the embodiment, the classification may be a people object or a non-people object. Generally speaking, the classification may be a primary object or a secondary object, where the primary object is a subject to be tracked and the secondary object is an object other than the primary object. In another embodiment, the classification may be one of three (or more) categories. The region of interest (ROI) may include a location and a size. For example, the ROI may be a rectangle with an end point (e.g., the upper left point) representing its location and a length and a width representing its size. In the embodiment, the image descriptor may include a color histogram that represents color distribution. Alternatively, the image descriptor may include a histogram of oriented gradient (HOG), a local binary pattern (LBP) or a Haar-like feature. For the 3D image capture device, the candidate information may further include depth.

The target tracking of the present invention will be described with respect to each branch flow of FIG. 1A in companion with FIG. 1B.

Figure 2:
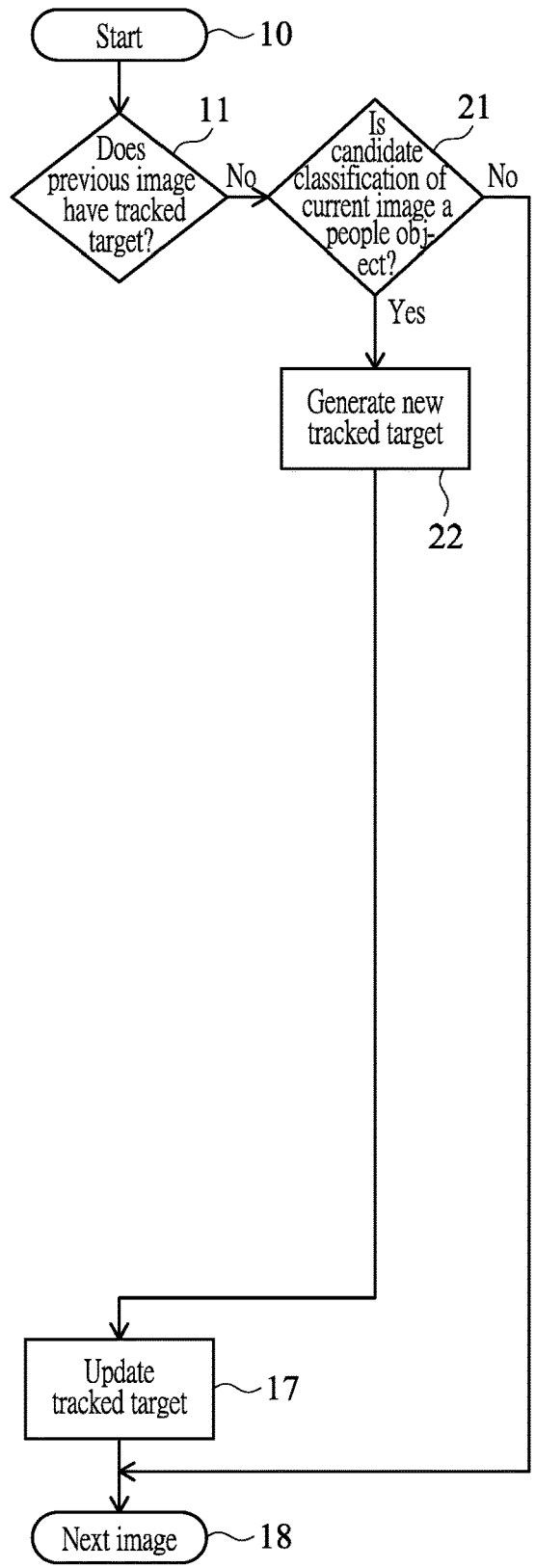
FIG. 2 shows one branch flow of the target tracking method of FIG. 1A, illustrating a situation where a previous image has no tracked target.

FIG. 2 shows one branch flow of the target tracking method 100 adaptable to multi-target tracking ("target tracking method" hereinafter) of FIG. 1A, illustrating a situation where a previous image has no tracked target. In one example, as no previous image exists when a system starts, there is thus no tracked target. As shown in FIG. 2, in step 10, the image detection unit 102 receives a current image captured by the image capture device 101, according to which candidate information (e.g., a classification, coordinates, a region of interest (ROI) and an image descriptor) of the current image may be generated. Subsequently, in step 11, it determines whether the previous image has a tracked target. If it determines that the previous image has no tracked target (e.g., when the system starts), the flow goes to step 21 to determine whether the classification of the candidate is the people object, according to the candidate information of the current image. If the determination of step 21 is positive, the flow goes to step 22, in which a new tracked target generating unit 201 may define the people-object candidate as a new tracked target and give the new tracked target a corresponding target number. If there is more than one people-object candidate, multiple new tracked targets may be generated and assigned corresponding target numbers respectively. Next, in step 17, a tracked target updating unit 105 may update information (e.g., coordinates, a region of interest (ROI), an image descriptor and a target number) of the tracked target according to the new tracked target. In the embodiment, the tracked target updating unit 105 may include a memory device such as a dynamic random access memory (DRAM) configured to store the information of the tracked target and the new tracked target. Afterwards, in step 18, a next image is processed by entering step 10 of the target tracking method 100.

If it determines in step 21 that there is no people-object candidate or even no candidate at all, the flow goes to step 18 to process a next image.

Figure 3:
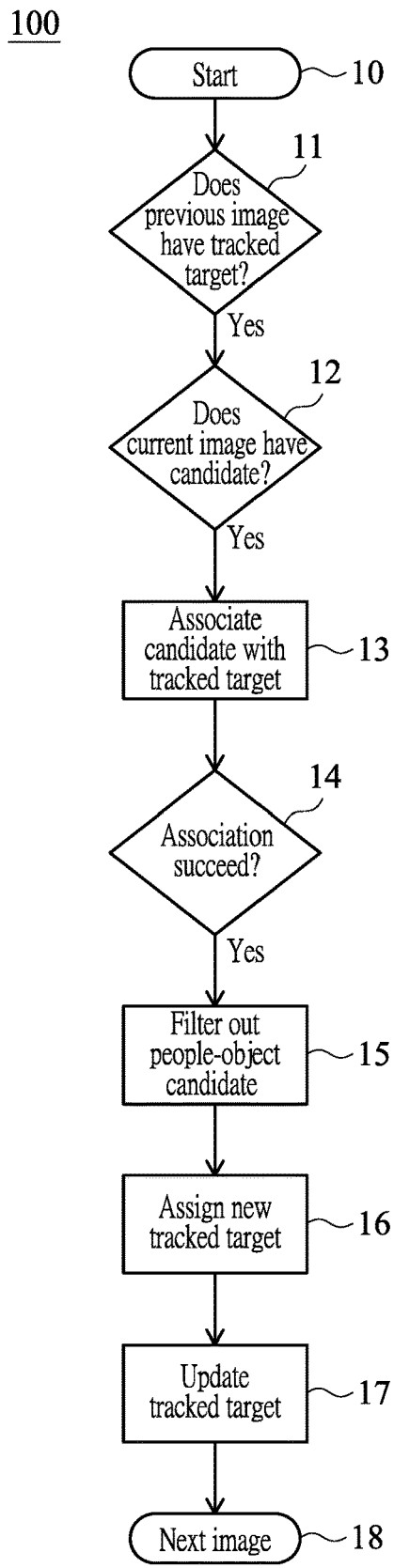
FIG. 3 shows one branch flow of the target tracking method of FIG. 1A, illustrating a situation where a previous image has a tracked target, a current image has a candidate, and an associated candidate related to the tracked target may be found.

FIG. 3 shows one branch flow of the target tracking method 100 of FIG. 1A, illustrating a situation where a previous image has a tracked target, a current image has a candidate, and an associated candidate related to the tracked target may be found. As described above, in step 10, candidate information (e.g., a classification, coordinates, a region of interest (ROI) and an image descriptor) of the current image may be generated. Subsequently, in step 11, it determines whether the previous image has a tracked target. If it determines that the previous image has a tracked target, the flow goes to step 12.

In step 12, it determines whether the current image has a candidate. If it determines that the current image has a (people-object or non-people-object) candidate, the flow goes to step 13. In step 13, an association unit 103 may perform association between the candidate and the tracked target to determine similarity between the candidate and the tracked target, and give a corresponding similarity value to the candidate. If there is more than one candidate, step 13 is repeatedly performed to determine similarity of each candidate.

Figure 4:
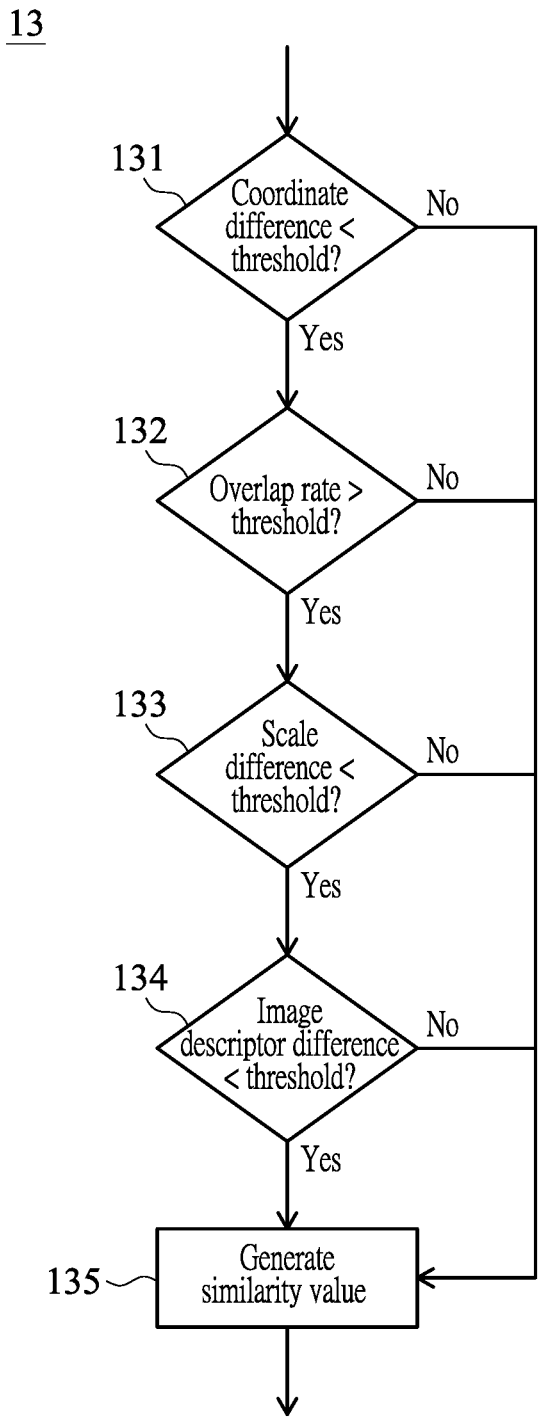
FIG. 4 shows a detailed flow diagram of step 13 of FIG. 1A/3, illustrating determining the similarity value of the candidate.

FIG. 4 shows a detailed flow diagram of step 13 of FIG. 1A/3, illustrating determining the similarity value of the candidate. In the embodiment, the similarity value is in a range from 0 to 1, and four association parameters are used to determine similarity between the candidate and the tracked target. In the embodiment, one or more of the following association parameters are used: (1) distance parameter, (2) overlap parameter, (3) scale parameter, and (4) image descriptor parameter. In another embodiment, a priority sequence and/or a quantity of association parameters may differ from that shown in FIG. 4.

In the embodiment, as exemplified in FIG. 4, it determines in step 131 whether a coordinate difference between the candidate and the tracked target is less than a predetermined threshold. If the determination of step 131 is negative (i.e., the coordinate difference is greater than the predetermined threshold), the flow geos to step 135 and the similarity value is set to zero; otherwise (i.e., the coordinate difference is less than the predetermined threshold), the flow goes to step 132. In step 132, it determines whether an overlap rate between regions of interest (ROIs) of the candidate and the tracked target is greater than a predetermined threshold. If the determination of step 132 is negative (i.e., the overlap rate is less than the predetermined threshold), the flow geos to step 135 and the similarity value is set to zero; otherwise (i.e., the overlap rate is greater than the predetermined threshold), the flow goes to step 133. In step 133, it determines whether a scale (e.g., a length-width ratio) difference between the candidate and the tracked target is less than a predetermined threshold. If the determination of step 133 is negative (i.e., the scale difference is greater than the predetermined threshold), the flow geos to step 135 and the similarity value is set to zero; otherwise (i.e., the scale difference is less than the predetermined threshold), the flow goes to step 134. In step 134, it determines whether an image descriptor (e.g., a color histogram) difference between the candidate and the tracked target is less than a predetermined threshold. If the determination of step 134 is negative (i.e., the image descriptor difference is greater than the predetermined threshold), the flow geos to step 135 and the similarity value is set to zero; otherwise (i.e., the image descriptor difference is less than the predetermined threshold), the flow goes to step 135 and a non-zero similarity value is generated according to results of steps 131-134.

Subsequently, in step 14, the association unit 103 may select a candidate with a maximum similarity value, which is defined as an associated candidate of the tracked target. If all candidates have the zero similarity value (or a similarity value less than a predetermined value), no associated candidate is obtained, details of which will be described later in companion with FIG. 5.

Still referring to FIG. 3, the associated candidate generated in step 14 may be fed to the tracked target updating unit 105, which may accordingly update information (e.g., coordinates, a region of interest (ROI), an image descriptor and a target number) of the tracked target. Next, in step 15, a filtering unit 104 may filter out a candidate with a non-zero similarity value (or a similarity value greater than a predetermined value) and with people-object classification other than the associated candidate defined as a filtered candidate, which may be a newly presented people object entering an image capture range. In step 16, the tracked target updating unit 105 may assign the filtered candidate new tracked target, and give the new tracked target a corresponding target number. If there is more than one filtered candidate, multiple new tracked targets may be generated and assigned corresponding target numbers respectively. Next, in step 17, the tracked target updating unit 105 may update information (e.g., coordinates, a region of interest (ROI), an image descriptor and a target number) of the tracked target according to the associated candidate and the filtered candidates. Afterwards, in step 18, a next image is processed.

Figure 5:
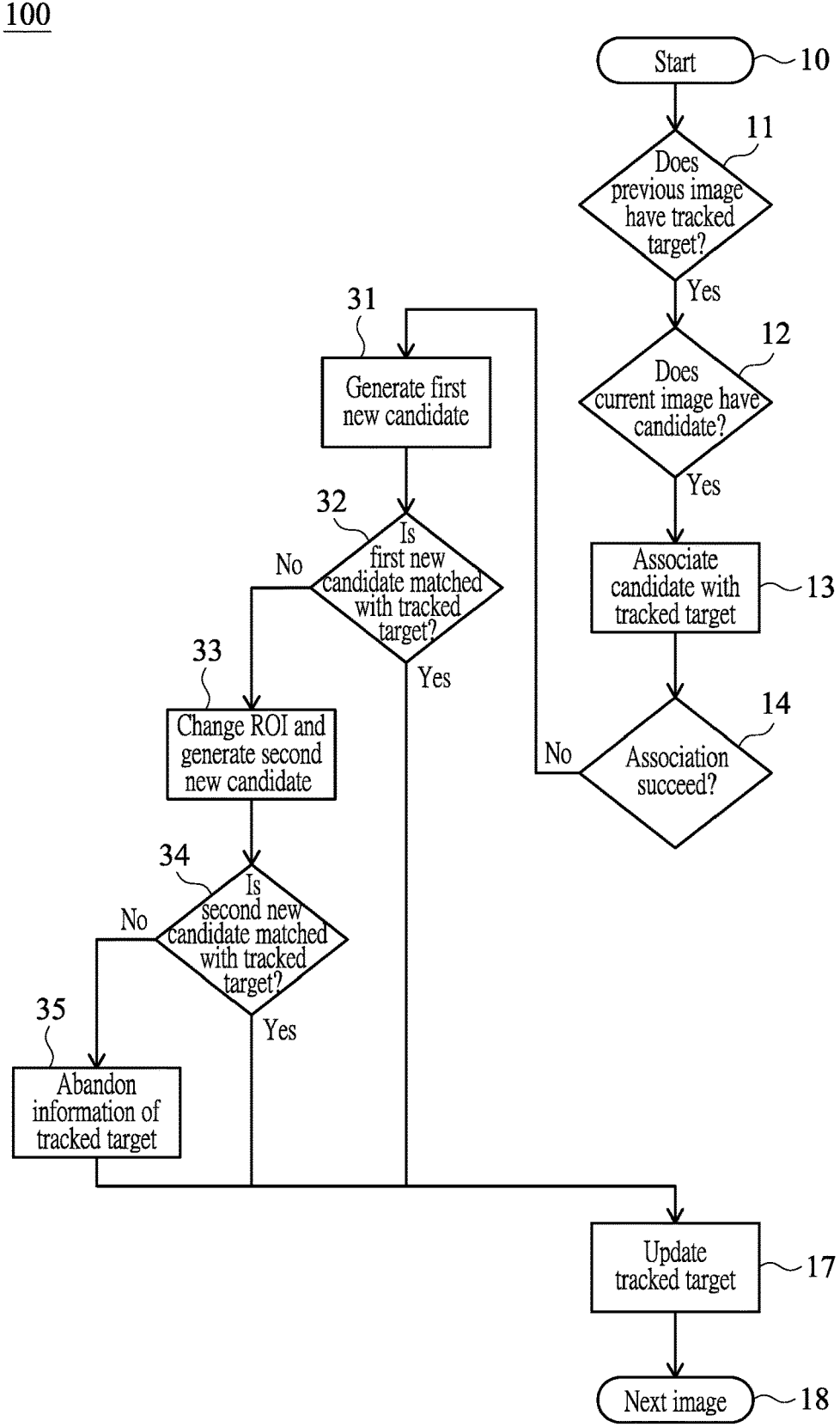
FIG. 5 shows one branch flow of the target tracking method of FIG. 1A, illustrating a situation where a previous image has a tracked target, a current image has a candidate, but an associated candidate related to the tracked target cannot be found.

FIG. 5 shows one branch flow of the target tracking method 100 of FIG. 1A, illustrating a situation where a previous image has a tracked target, a current image has a candidate, but an associated candidate related to the tracked target cannot be found. Steps 11 to 14 are similar to those in FIG. 3 with the exception that an associated candidate related to the tracked target cannot be found in step 14. One reason why an associated candidate cannot be found may be that the tracked target leaves an image capture range; another reason may be that the target tracking is performed in error. In order to recover from erroneous tracking, the following steps 31 to 35 are performed to find a candidate again in the vicinity of the tracked target.

In step 31, a new candidate generating unit 301 may project information of a region of interest (ROI) of the previous image onto the current image, followed by defining content of the projected ROI region of the current image as a first new candidate, and obtaining a corresponding image descriptor (e.g., color histogram) of the first new candidate. Subsequently, in step 32, a matching unit 302 may perform matching between the first new candidate and the tracked target to determine similarity therebetween. In other words, the first new candidate is compared with the tracked target. In the embodiment, it determines whether an image descriptor (e.g., color histogram) difference between the first new candidate and the tracked target is less than a predetermined threshold in a manner similar to step 134 of FIG. 4. If the determination of step 32 is positive (i.e., the image descriptor difference is less than the predetermined threshold), indicating that the matching succeeds (i.e., the first new candidate is similar to the tracked target), the matched first new candidate may be fed to the tracked target updating unit 105, which may define the matched first new candidate as a new tracked target. Next, in step 17, the tracked target updating unit 105 may update information (e.g., coordinates, a region of interest (ROI), an image descriptor and a target number) of the tracked target. Afterwards, in step 18, a next image is processed.

If the determination of step 32 is negative (i.e., the image descriptor difference is greater than the predetermined threshold), indicating that the matching fails, the flow then goes to step 33. In step 33, the new candidate generating unit 301 may change the projected ROI of the current image, and define content of the changed projected ROI as a second new candidate and obtain a corresponding image descriptor (e.g., color histogram) of the second new candidate. In the embodiment, the projected ROI may be changed by proportionally scaling up (e.g., by 25%) the projected ROI. In another embodiment, the projected ROI may be changed by shifting the projected ROI.

Subsequently, in step 34, the matching unit 302 may perform matching between the second new candidate and the tracked target to determine similarity therebetween. In the embodiment, it determines whether an image descriptor (e.g., color histogram) difference between the second new candidate and the tracked target is less than a predetermined threshold in a manner similar to step 32. If the determination of step 34 is positive (i.e., the image descriptor difference is less than the predetermined threshold), indicating that the matching succeeds, the matched second new candidate may be fed to the tracked target updating unit 105, which may define the matched second new candidate as a new tracked target. Next, in step 17, the tracked target updating unit 105 may update information (e.g., coordinates, a region of interest (ROI), an image descriptor and a target number) of the tracked target. Afterwards, in step 18, a next image is processed. If the determination of step 34 is negative (i.e., the image descriptor difference is greater than the predetermined threshold), indicating that the matching fails, the tracked target may probably leave an image capture range. The flow then goes to step 35, in which the information of the tracked target is abandoned. Next, in step 17, the tracked target updating unit 105 may update information (e.g., coordinates, a region of interest (ROI), an image descriptor and a target number) of the tracked target. Afterwards, in step 18, a next image is processed.

Figure 6:
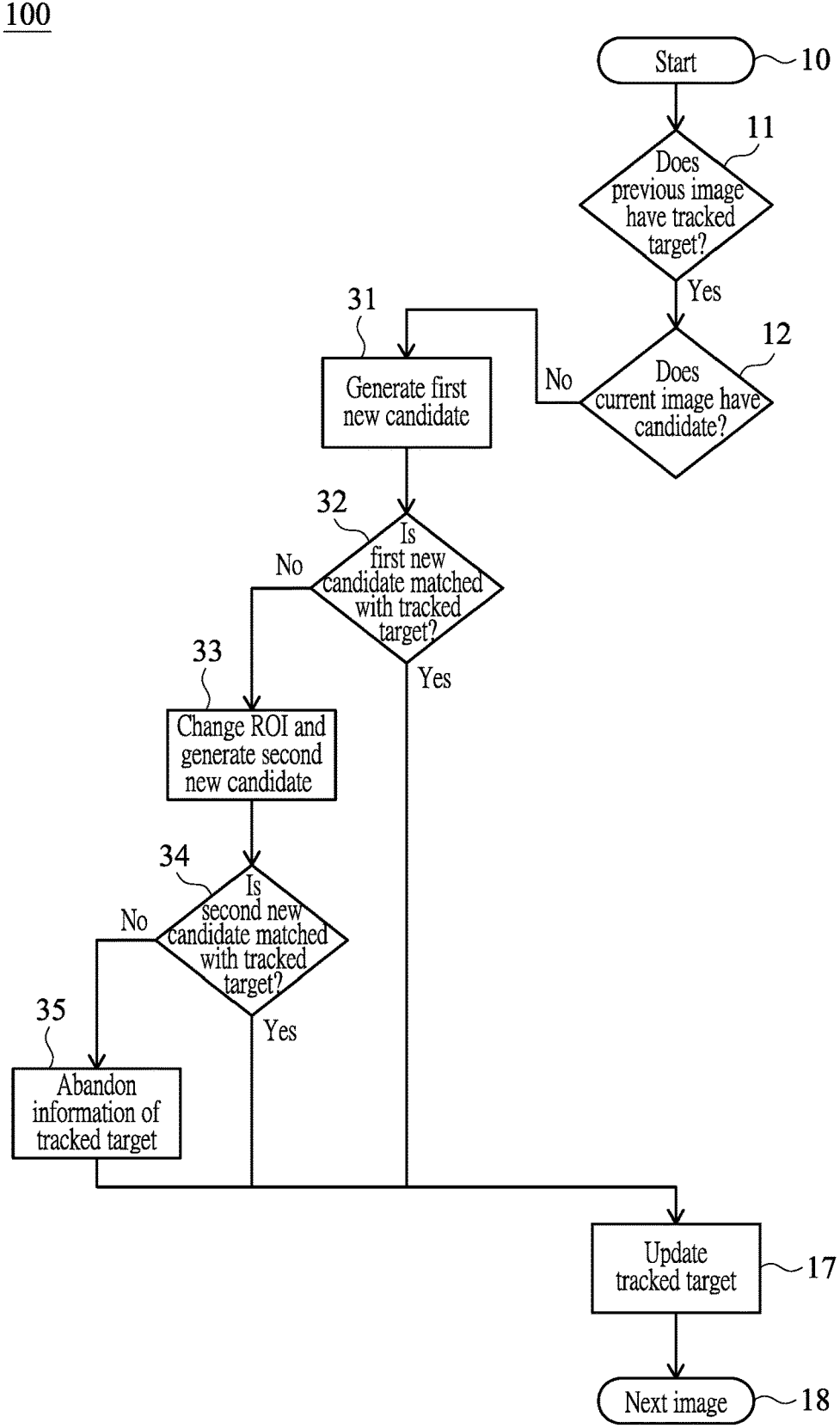
FIG. 6 shows one branch flow of the target tracking method of FIG. 1A, illustrating a situation where a previous image has a tracked target but a current image has no candidate.

FIG. 6 shows one branch flow of the target tracking method 100 of FIG. 1A, illustrating a situation where a previous image has a tracked target but a current image has no candidate. Steps 10 to 12 are similar to those in FIG. 3 or FIG. 5 with the exception that the current image has no candidate as determined in step 12. The following steps 31 to 35 are performed to find a candidate again in the vicinity of the tracked target. Steps 31 to 35 are similar to those in FIG. 5 and are briefly described as follows.

In step 31, the new candidate generating unit 301 may generate a first new candidate and obtain a corresponding image descriptor (e.g., color histogram) of the first new candidate. Subsequently, in step 32, the matching unit 302 may perform matching between the first new candidate and the tracked target to determine similarity therebetween. If the determination of step 32 is positive, indicating that the matching succeeds, the matched first new candidate may be defined as a new tracked target. Next, in step 17, the tracked target updating unit 105 may update information of the tracked target. Afterwards, in step 18, a next image is processed.

If the determination of step 32 is negative, indicating that the matching fails, the flow then goes to step 33. In step 33, the new candidate generating unit 301 may change the projected ROI of the current image, and define the changed projected ROI as a second new candidate and obtain a corresponding image descriptor (e.g., color histogram) of the second new candidate.

Subsequently, in step 34, the matching unit 302 may perform matching between the second new candidate and the tracked target to determine similarity therebetween. If the determination of step 34 is positive, indicating that the matching succeeds, the matched second new candidate may be fed to the tracked target updating unit 105, which may define the matched second new candidate as a new tracked target. Next, in step 17, the tracked target updating unit 105 may update information of the tracked target. Afterwards, in step 18, a next image is processed. If the determination of step 34 is negative, indicating that the matching fails, the tracked target may probably leave an image capture range. The flow then goes to step 35, in which the information of the tracked target is abandoned. Next, in step 17, the tracked target updating unit 105 may update information of the tracked target. Afterwards, in step 18, a next image is processed.

Although specific embodiments have been illustrated and described, it will be appreciated by those skilled in the art that various modifications may be made without departing from the scope of the present invention, which is intended to be limited solely by the appended claims.

What is claimed is:

1. A target tracking method adaptable to multi-target tracking, comprising:
    performing global-search detection on a current image to obtain candidates of the current image;
    performing association between the candidates and a tracked target to determine similarity between the candidates and the tracked target and to give corresponding similarity values to the candidates;
    selecting a candidate with a maximum similarity value, the selected candidate being defined as an associated candidate of the tracked target;
    filtering the candidates to obtain candidates with non-zero similarity values and primary-object classification other than the associated candidate, the obtained candidates being defined as filtered candidates that represent newly presented objects entering an image capture range; and
    generating new tracked targets according to the associated candidate and the filtered candidates;
    wherein the step of performing association between the candidates and the tracked target comprises the following steps:
    determining whether a coordinate difference between the candidate and the tracked target is less than a predetermined first threshold, the similarity value being set to zero if the coordinate difference is not less than the predetermined first threshold;
    determining whether an overlap rate between regions of interest (ROIs) of the candidate and the tracked target is greater than a predetermined second threshold if the coordinate difference is less than the predetermined first threshold, the similarity value being set to zero if the overlap rate is not greater than the predetermined second threshold;
    determining whether a scale difference between the candidate and the tracked target is less than a predetermined third threshold if the overlap rate is greater than the predetermined second threshold, the similarity value being set to zero if the scale difference is not less than the predetermined third threshold;
    determining whether an image descriptor difference between the candidate and the tracked target is less than a predetermined fourth threshold if the scale difference is less than the predetermined third threshold, the similarity value being set to zero if the image descriptor difference is not less than the predetermined fourth threshold; and
    setting the similarity value to non-zero if the image descriptor difference is less than the predetermined fourth threshold.

2. The method of claim 1, wherein if a previous image has no tracked target, the following steps are performed:
    determining whether classification of the candidate of the current image is a primary object; and
    defining the candidate with primary-object classification as a new tracked target if the classification is the primary object.

3. The method of claim 1, wherein if no associated candidate exists, the following steps are performed:
    projecting a region of interest of the tracked target of a previous image onto the current image, and defining the projected region of interest as a first new candidate;
    performing matching between the first new candidate and the tracked target to determine similarity therebetween; and
    defining the first new candidate as a new tracked target if the first new candidate is similar to the tracked target.

4. The method of claim 3, wherein the step of performing matching between the first new candidate and the tracked target comprises:
    comparing an image descriptor of the first new candidate with an image descriptor of the tracked target.

5. The method of claim 3, wherein if the first new candidate is not similar to the tracked target, the following steps are performed:
    changing the projected region of interest of the current image, the changed projected region of interest being defined as a second new candidate;
    performing matching between the second new candidate and the tracked target to determine similarity therebetween; and
    defining the second new candidate as a new tracked target if the second new candidate is similar to the tracked target.

6. The method of claim 5, wherein the step of performing matching between the second new candidate and the tracked target comprises:
    comparing an image descriptor of the second new candidate with an image descriptor of the tracked target.

7. The method of claim 5, wherein the step of changing the projected region of interest of the current image comprises:
    scaling up or shifting the projected region of interest.

8. The method of claim 1, wherein the candidate of the current image comprises candidate information composed of a classification, coordinates, a region of interest and an image descriptor.

9. The method of claim 8, wherein the image descriptor comprises a color histogram.

10. A target tracking system adaptable to multi-target tracking, comprising:
    an image detection unit that performs global-search detection on a current image to obtain candidates of the current image;
    an association unit that performs association between the candidates and a tracked target to determine similarity between the candidates and the tracked target and to give corresponding similarity values to the candidates, the association unit selecting a candidate with a maximum similarity value and the selected candidate being defined as an associated candidate of the tracked target;
    a filtering unit that filters the candidates to obtain candidates with non-zero similarity values and primary-object classification other than the associated candidate, the obtained candidates being defined as filtered candidates that represent newly presented objects entering an image capture range; and
    a tracked target updating unit that generates new tracked targets according to the associated candidate and the filtered candidates;

wherein the association unit performs association between the candidates and the tracked target by executing the following steps:

determining whether a coordinate difference between the candidate and the tracked target is less than a predetermined first threshold, the similarity value being set to zero if the coordinate difference is not less than the predetermined first threshold;

determining whether an overlap rate between regions of interest (ROIs) of the candidate and the tracked target is greater than a predetermined second threshold if the coordinate difference is less than the predetermined first threshold, the similarity value being set to zero if the overlap rate is not greater than the predetermined second threshold;

determining whether a scale difference between the candidate and the tracked target is less than a predetermined third threshold if the overlap rate is greater than the predetermined second threshold, the similarity value being set to zero if the scale difference is not less than the predetermined third threshold;

determining whether an image descriptor difference between the candidate and the tracked target is less than a predetermined fourth threshold if the scale difference is less than the predetermined third threshold, the similarity value being set to zero if the image descriptor difference is not less than the predetermined fourth threshold; and setting the similarity value to non-zero if the image descriptor difference is less than the predetermined fourth threshold.

11. The system of claim 10, further comprising a new tracked target generating unit that performs the following steps if a previous image has no tracked target:

determining whether classification of the candidate of the current image is a primary object; and defining the candidate with primary-object classification as a new tracked target if the classification is the primary object.

12. The system of claim 10, further comprising a new candidate generating unit that performs the following steps if no associated candidate exists:

projecting a region of interest of the tracked target of a previous image onto the current image, and defining the projected region of interest as a first new candidate;

performing matching between the first new candidate and the tracked target to determine similarity therebetween; and defining the first new candidate as a new tracked target if the first new candidate is similar to the tracked target.

13. The system of claim 12, wherein the step of performing matching between the first new candidate and the tracked target comprises:

comparing an image descriptor of the first new candidate with an image descriptor of the tracked target.

14. The system of claim 12, wherein the new candidate generating unit performs the following steps if the first new candidate is not similar to the tracked target:

changing the projected region of interest of the current image, the changed projected region of interest being defined as a second new candidate;

performing matching between the second new candidate and the tracked target to determine similarity therebetween; and defining the second new candidate as a new tracked target if the second new candidate is similar to the tracked target.

15. The system of claim 14, wherein the step of performing matching between the second new candidate and the tracked target comprises:

comparing an image descriptor of the second new candidate with an image descriptor of the tracked target.

16. The system of claim 14, wherein the step of changing the projected region of interest of the current image comprises:

scaling up or shifting the projected region of interest.

17. The system of claim 10, wherein the candidate of the current image comprises candidate information composed of a classification, coordinates, a region of interest and an image descriptor.

18. The system of claim 17, wherein the tracked target updating unit comprises a memory device that stores information of the tracked target and the new tracked targets.

* * * * *